US009475138B2

(12) United States Patent
Morrison et al.

(10) Patent No.: US 9,475,138 B2
(45) Date of Patent: Oct. 25, 2016

(54) CUTTING TOOL HAVING INSERT POCKET WITH CANTILEVERED MEMBER

(71) Applicant: Kennametal Inc., Latrobe, PA (US)

(72) Inventors: Lewis Ray Morrison, Latrobe, PA (US); Ravishankar Iyer, North Huntingdon, PA (US); Scott Patrick Rusnock, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 145 days.

(21) Appl. No.: 14/160,932

(22) Filed: Jan. 22, 2014

(65) Prior Publication Data
US 2015/0202698 A1    Jul. 23, 2015

(51) Int. Cl.
*B23C 5/24* (2006.01)
*B23C 5/20* (2006.01)
*B23C 5/22* (2006.01)

(52) U.S. Cl.
CPC .............. *B23C 5/2472* (2013.01); *B23C 5/202* (2013.01); *B23C 5/2406* (2013.01); *B23C 5/2489* (2013.01); *B23C 5/2493* (2013.01); *B23C 5/22* (2013.01); *B23C 5/24* (2013.01); *B23C 5/241* (2013.01); *B23C 2200/0455* (2013.01); *B23C 2200/367* (2013.01); *B23C 2210/16* (2013.01); *B23C 2245/00* (2013.01); *B23C 2260/04* (2013.01); *B23C 2270/06* (2013.01); *Y10T 407/1912* (2015.01)

(58) Field of Classification Search
CPC .......... B23C 2210/16; B23C 2245/00; B23C 2260/04; B23C 5/2472; B23C 5/2493; B23C 2200/367; B23C 5/006; B23C 5/08; B23C 5/22; B23C 5/24; B23C 2200/0455; B23C 5/2489; B23C 2205/02
See application file for complete search history.

(56) References Cited

U.S. PATENT DOCUMENTS

| 3,056,186 A | 10/1962 | Greenleaf |
| 3,675,290 A * | 7/1972 | Mayer .................. B23C 5/2444 407/37 |
| 3,875,663 A | 4/1975 | Gustafson |
| 4,040,156 A * | 8/1977 | Tack ..................... B23C 5/2444 407/40 |

(Continued)

FOREIGN PATENT DOCUMENTS

| DE | WO 9717157 A1 * | 5/1997 | ............. B23C 5/202 |
| DE | 10250018 A1 * | 5/2004 | ....... B23B 29/03421 |

(Continued)

OTHER PUBLICATIONS

N/A, , "Milling Cutters", http://www.prezisstools.com/face-milling-cutters-and-circular-milling-cutters.html.

(Continued)

*Primary Examiner* — Sara Addisu
(74) *Attorney, Agent, or Firm* — Matthew S. Bedsole

(57) ABSTRACT

A cutting tool (has a central, longitudinal axis and a tool body including an insert pocket with a bottom wall, a rear wall and at least one side wall. A cantilevered member is machined from the tool body so as to be integrally formed with the tool body. The cantilevered member extends from one of the walls of the insert pocket. An adjustment screw exerts a force against the cantilevered member to selectively adjust a position of a cutting insert mounted on the cantilevered member with respect to the central, longitudinal axis of the cutting tool. A method for selectively adjusting a position of the cutting insert is also disclosed.

11 Claims, 8 Drawing Sheets

(56) References Cited

U.S. PATENT DOCUMENTS

| | | | |
|---|---|---|---|
| 4,124,326 A | 11/1978 | Cost | |
| 4,214,846 A | 7/1980 | Kraemer | |
| 4,247,232 A * | 1/1981 | McCreery | B23B 27/141 407/114 |
| 4,318,318 A * | 3/1982 | Schott | B23B 27/143 407/113 |
| 4,341,493 A | 7/1982 | Erkfritz | |
| 4,462,725 A | 7/1984 | Amir Satran | |
| 4,470,731 A | 9/1984 | Erkfritz | |
| 4,556,345 A | 12/1985 | Philippi | |
| 4,575,287 A | 3/1986 | Oshnock et al. | |
| 4,597,695 A | 7/1986 | Johnson | |
| 4,631,994 A | 12/1986 | Jester et al. | |
| 4,848,977 A | 7/1989 | Kieninger | |
| 4,963,061 A * | 10/1990 | Katbi | B23B 27/143 407/113 |
| 4,993,890 A * | 2/1991 | Tukala | B23C 5/207 407/34 |
| 5,211,516 A | 5/1993 | Dieter Kress | |
| 5,405,711 A * | 4/1995 | Noggle | B23B 27/143 407/114 |
| 5,816,751 A | 10/1998 | Frecska | |
| 6,056,484 A * | 5/2000 | Mitchell | G23C 5/2493 407/36 |
| 6,109,838 A | 8/2000 | Riviere | |
| 6,167,958 B1 | 1/2001 | Lynde | |
| 6,511,264 B2 * | 1/2003 | Ripley | B23C 5/2493 407/36 |
| 6,523,768 B2 | 2/2003 | Recker et al. | |
| 6,607,335 B2 | 8/2003 | Morgulis | |
| 6,733,212 B2 * | 5/2004 | Nagaya | B23C 5/207 407/113 |
| 6,902,357 B2 * | 6/2005 | Blessing | B23B 51/0433 407/41 |
| 6,971,823 B2 * | 12/2005 | Satran | B23C 5/08 407/101 |
| D523,040 S | 6/2006 | Niebauer et al. | |
| 7,080,963 B2 * | 7/2006 | Schaupp | B23C 5/241 407/36 |
| 7,086,812 B2 | 8/2006 | Gamble et al. | |
| 7,131,794 B2 | 11/2006 | Robinson et al. | |
| 7,367,753 B2 | 5/2008 | Maurer | |
| 7,390,150 B2 | 6/2008 | Kocherovsky et al. | |
| 7,410,332 B2 | 8/2008 | Scherbarth | |
| 7,513,717 B2 | 4/2009 | Engström et al. | |
| 7,534,075 B2 * | 5/2009 | Kress | B23B 27/145 407/113 |
| 7,909,544 B2 * | 3/2011 | Jansson | B23C 5/06 407/100 |
| 7,976,250 B2 | 7/2011 | Fang et al. | |
| 7,997,833 B2 | 8/2011 | Hayashizaki et al. | |
| 8,057,131 B2 | 11/2011 | Conway | |
| 8,091,205 B2 * | 1/2012 | Kadosh | B23C 5/08 29/468 |
| 8,092,124 B2 * | 1/2012 | Spichtinger | B23C 5/006 407/11 |
| 8,282,320 B2 | 10/2012 | Hartlohner et al. | |
| 8,337,123 B2 * | 12/2012 | Ishida | B23C 5/06 407/113 |
| 8,388,270 B2 * | 3/2013 | Waggle | B23C 5/08 144/235 |
| 8,434,974 B2 | 5/2013 | Spitzenberger | |
| 8,454,278 B2 | 6/2013 | Hartlohner et al. | |
| 8,695,189 B2 * | 4/2014 | Hecht | B23B 29/04 29/267 |
| D710,409 S | 8/2014 | Morrison et al. | |
| D713,433 S * | 9/2014 | Morrison | D15/139 |
| 8,978,526 B2 * | 3/2015 | Nedzlek | B23C 5/08 407/75 |
| 9,044,813 B2 * | 6/2015 | Choi | B23C 5/08 |
| 9,211,596 B2 * | 12/2015 | Hecht | B23C 5/22 |
| 9,216,461 B2 * | 12/2015 | Athad | B23C 5/006 |
| 2001/0051075 A1 * | 12/2001 | Focken | B23C 5/241 407/34 |
| 2003/0010178 A1 * | 1/2003 | Trimpe | B23C 5/08 83/840 |
| 2004/0191008 A1 * | 9/2004 | Noggle | B23C 5/06 407/46 |
| 2007/0041797 A1 * | 2/2007 | Jang | B23C 5/006 407/40 |
| 2008/0232910 A1 * | 9/2008 | Hecht | B23C 5/241 407/39 |
| 2009/0136304 A1 * | 5/2009 | Satran | B23C 5/2074 407/104 |
| 2009/0285646 A1 | 11/2009 | Oprasic et al. | |
| 2009/0290944 A1 * | 11/2009 | Gamble | B23C 5/08 407/76 |
| 2010/0129167 A1 | 5/2010 | Morrison | |
| 2010/0150671 A1 | 6/2010 | Oprasic et al. | |
| 2010/0221076 A1 | 9/2010 | Takahashi | |
| 2011/0305535 A1 | 12/2011 | Jansson | |
| 2012/0051852 A1 | 3/2012 | Choi et al. | |
| 2012/0051855 A1 | 3/2012 | Löf | |
| 2012/0070239 A1 | 3/2012 | Park | |
| 2012/0282054 A1 | 11/2012 | Jager | |
| 2013/0022417 A1 * | 1/2013 | Gesell | B23C 5/207 407/113 |
| 2013/0129434 A1 | 5/2013 | Bhagath | |
| 2013/0195566 A1 | 8/2013 | Bhagath | |
| 2013/0195567 A1 * | 8/2013 | Sunnvius | B23C 5/06 407/40 |
| 2014/0086696 A1 | 3/2014 | Fang | |
| 2014/0178136 A1 * | 6/2014 | Mokthar | B23C 5/2406 407/51 |
| 2015/0165527 A1 | 6/2015 | Roman | |

FOREIGN PATENT DOCUMENTS

| | | | |
|---|---|---|---|
| DE | 202013009712 U1 * | 12/2013 | B23C 5/2406 |
| EP | 0287711 B2 | 6/1997 | |
| EP | 2 614 908 A1 | 7/2013 | |
| FR | 2894858 A1 | 6/2007 | |
| GB | 1164322 | 9/1969 | |
| JP | 2004042157 A * | 2/2004 | |
| JP | 2004209615 A | 7/2004 | |
| TW | M424204 U1 * | 11/2012 | |
| WO | WO9717157 | 5/1997 | |
| WO | WO2012102480 A2 | 8/2012 | |

OTHER PUBLICATIONS

N/A, , "Tungmill", http://www.imc-companies.com/Tungaloy/tcat/familyhdr.asp?fnum=44&app=802&mapp=IT&GFSTYP=M&lang=EN&type=1.
Jul. 6, 2015 Office Action (3 months) 1 US 2015-0098768 A1.
Jul. 15, 2015 Office action (3 months) 1 US20150071717A1.
Jul. 17, 2015 Office Action (3 months) 1 US20150086284A1.
Sep. 2, 2015 Notice of Allowance US20150071717A1.
Sep. 16, 2015 Notice of Allowance US 2015-0098768 A1.
Sep. 30, 2015 Notice of Allowance US20150086284A1.

* cited by examiner

US 9,475,138 B2

CUTTING TOOL HAVING INSERT POCKET WITH CANTILEVERED MEMBER

BACKGROUND OF THE INVENTION

1. Filed of the Invention

The invention pertains to the field of cutting tools. More particularly, the invention pertains to a cutting tool having a cantilevered member extending into an insert pocket for selectively adjusting a position of a cutting insert mounted on the cantilevered member.

2. Description of Related Art

Typical metalworking operations are conducted with a machine tool or similar equipment using a cutting insert. Conventional cutting tools employ various means for securing cutting inserts to a cutter body. In some cutting tools, threaded bores are provided in the cutting body and corresponding through holes are proved in the cutting inserts. The cutting inserts are directly secured to the cutter body by using screws. However, such a method requires the threaded bores to be formed in the cutter body, and can weaken the cutter body.

Accordingly, there is a need in the art for an improved cutting tool for high speed milling operations in which the position of the cutting insert can be adjusted.

SUMMARY OF THE INVENTION

The problem of adjusting a position of a cutting insert in a milling cutter is solved by machining a cantilevered member extending from one of the side walls of the insert pocket and mounting the cutting insert on the cantilevered member.

In one aspect of the invention, a cutting tool has a central, longitudinal axis and a tool body including an insert pocket with a bottom wall, a rear wall and at least one side wall. A cantilevered member extends from one of the walls of the insert pocket. An adjustment screw exerts a force against the cantilevered member to selectively adjust a position of a cutting insert mounted on the cantilevered member.

In another aspect of the invention, a combination cutting tool and cutting insert includes a cutting tool having a central, longitudinal axis and a tool body including an insert pocket with a bottom wall, a rear wall and at least one side wall. A cantilevered member extends from one of the walls of the insert pocket. An adjustment screw engages the cantilevered member. The cutting insert is mounted on the cantilevered member and includes a top surface, a bottom surface, and a plurality of side surfaces. Each side surface includes a first pair of chip grooves extending perpendicular to a central, longitudinal axis, and a second pair of chip grooves extending parallel to the central, longitudinal axis. A plurality of primary wiper cutting edges are formed at an intersection between each of the first pair of chip grooves and the top and bottom surfaces, wherein the adjustment screw exerts a force against the cantilevered member to selectively adjust a position of the primary wiper cutting edges of the cutting insert with respect to the central, longitudinal axis of the cutting tool.

In another aspect of the invention, a method for selectively adjusting a position of a cutting insert mounted on a cutting tool, the cutting tool including a tool body with an insert pocket, the method comprising:

machining a cantilevered member into the tool body such that the cantilevered member extends into the insert pocket;

mounting the cutting insert on the cantilevered member; and exerting a force against the cantilevered member such that a position of the cutting insert is selectively adjusted with respect to a central, longitudinal axis of the cutting tool.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
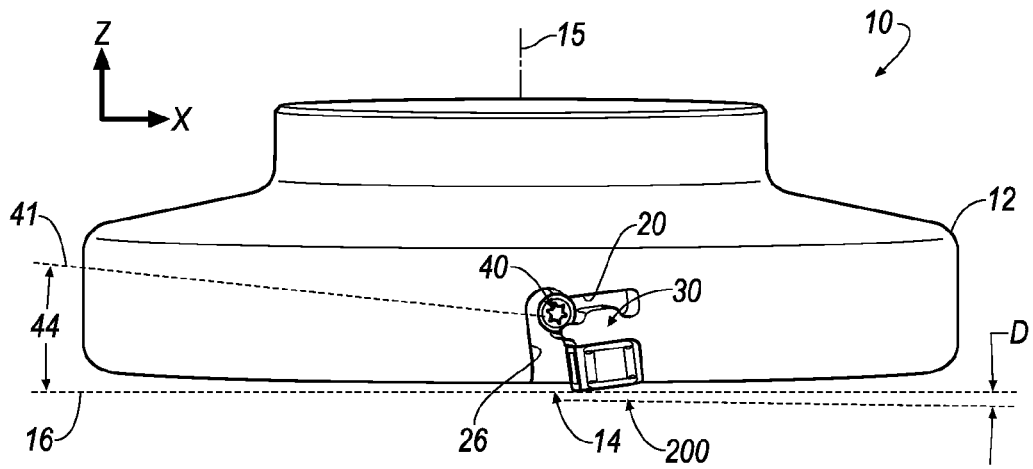
FIG. 1 is a side view of a milling cutter with a cutting insert isometrically mounted in an adjustable pocket according to an embodiment of the invention.

Referring now to FIGS. 1-5, a cutting tool 10, such as a milling cutter, is shown according to an embodiment of the invention. The milling cutter 10 comprises a tool body 12 with a plurality of circumferentially-spaced insert pockets 14 (only one pocket 14 is shown for brevity). The tool body 12 is made of metal, such as steel, and has a central, longitudinal axis 15 (i.e. in the direction of the z-axis), an x-axis 16 perpendicular to the z-axis, and a y-axis 17 perpendicular to both the x-axis and the z-axis. The tool body 12 is designed to be rotatably driven about a central longitudinal axis 15 (i.e. about the z-axis) in a direction R. Each pocket 14 is adapted to receive the cutting insert 200, which is securely held in the pocket 14 by means of a mounting screw 18, and the like. Only a single pocket 14 in which the cutting insert 200 is isometrically mounted is shown in the illustrated embodiment for brevity. However, it will be appreciated that the invention is not limited by the number of pockets 14 in which the cutting insert 200 can be isometrically mounted therein, and that the invention can be practiced with any desirable number of pockets 14 that are capable of isometrically mounting the cutting insert 200.

Figure 4:
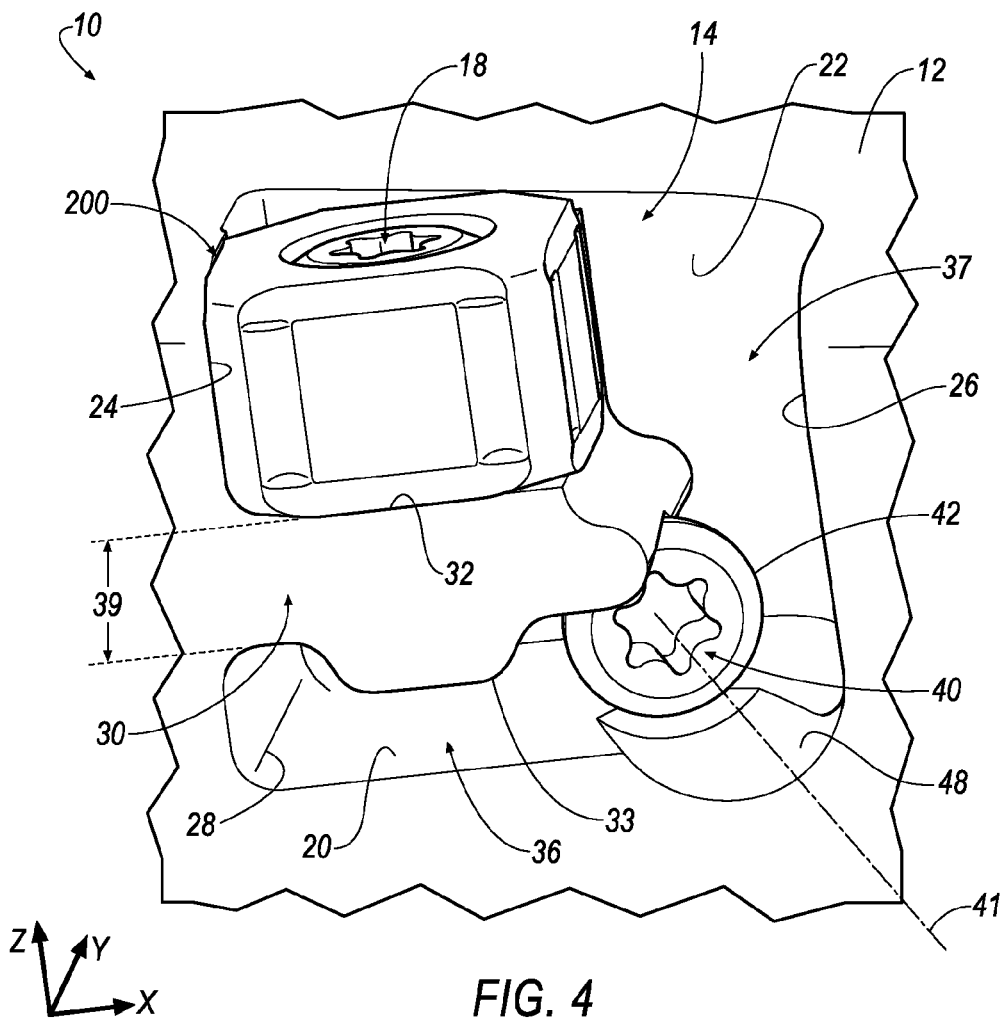
FIG. 4 is an enlarged isometric top view of the pocket of the milling cutter of FIG. 1 with the cutting insert isometrically mounted in the adjustable pocket.

As shown in FIG. 4, each pocket 14 of the cutting tool 10 includes a bottom wall 20, a rear wall 22 and at least one side wall 24, 26. The pocket 14 may also include a corner relief 28 at the intersection between the bottom wall 20 and one or more of the side walls 24, 26.

One aspect of the invention is that a position of the cutting insert 200 can be selectively adjusted when mounted in the pocket 14 of the milling cutter 10. This is accomplished by mounting the cutting insert 200 on a cantilevered member, shown generally at 30, integrally formed with the tool body 12 by machining the cantilevered member 30 from the tool body 12.

As shown in FIG. 4, the cantilevered member 30 extends outwardly from one of the walls 20, 22, 24, 26 of the insert pocket 14. In the illustrated embodiment, the cantilevered member 30 extends from the side wall 24 toward the opposite side wall 26. It should be appreciated that the principles of the invention can be practiced by extending the cantilevered member 30 from any of the walls 20, 22, 24, 26 of the insert pocket 14.

Figure 2:
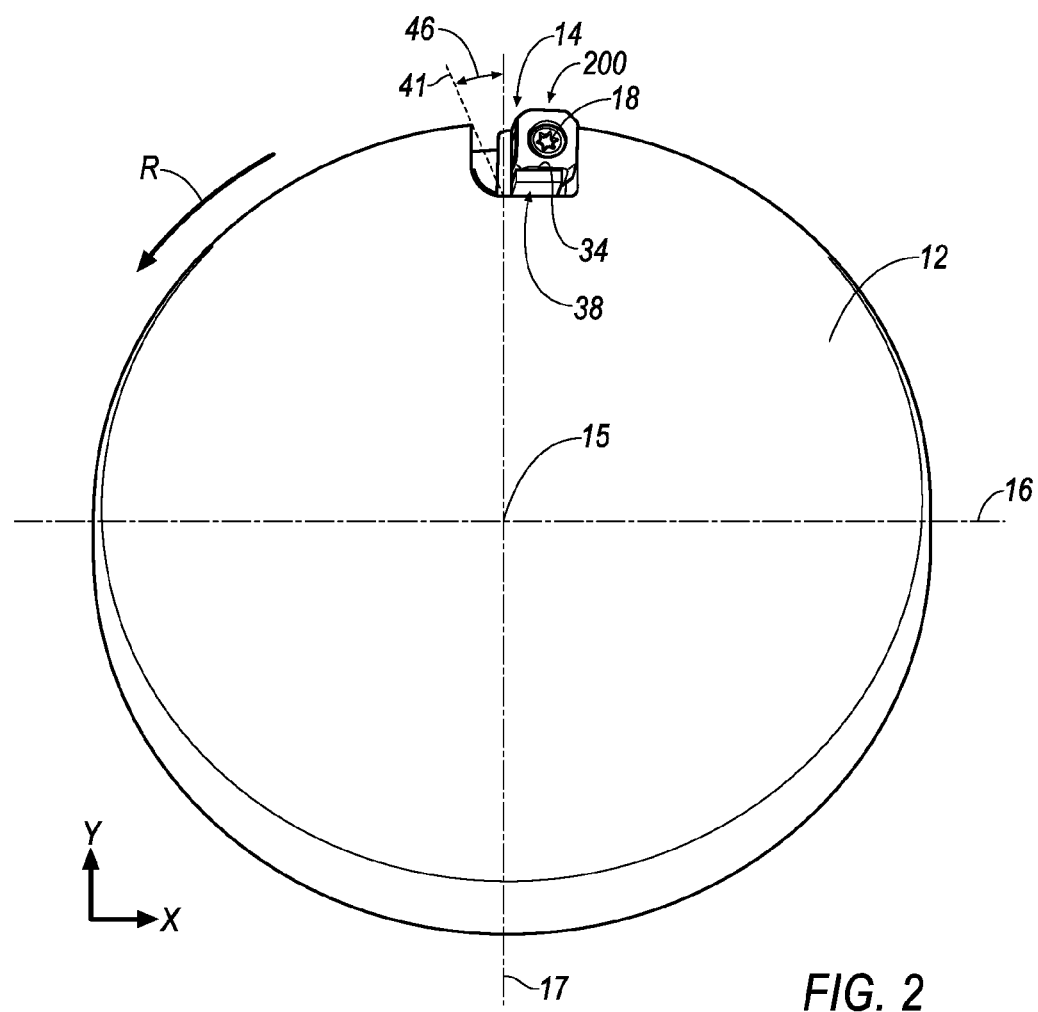
FIG. 2 is a top view of the milling cutter of FIG. 1.
Figure 3:
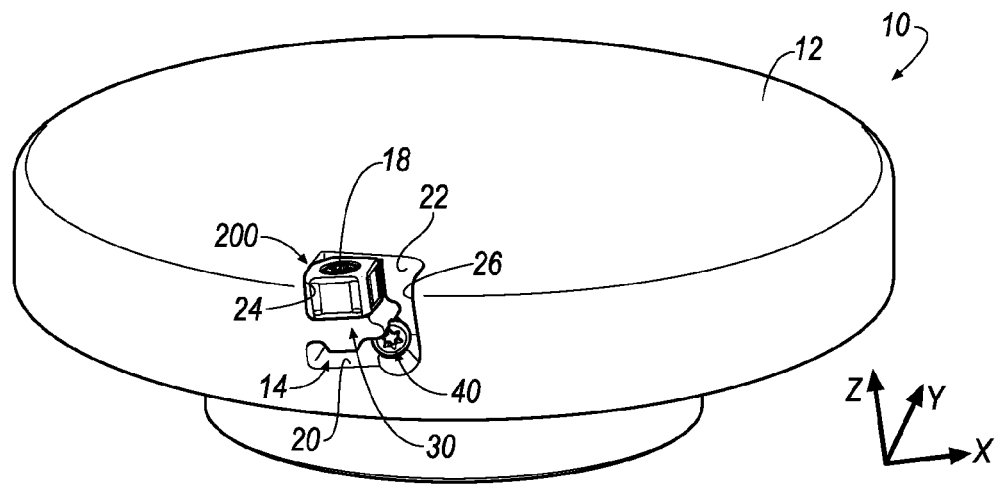
FIG. 3 is an isometric top view of the milling cutter of FIG. 1.
Figure 5:
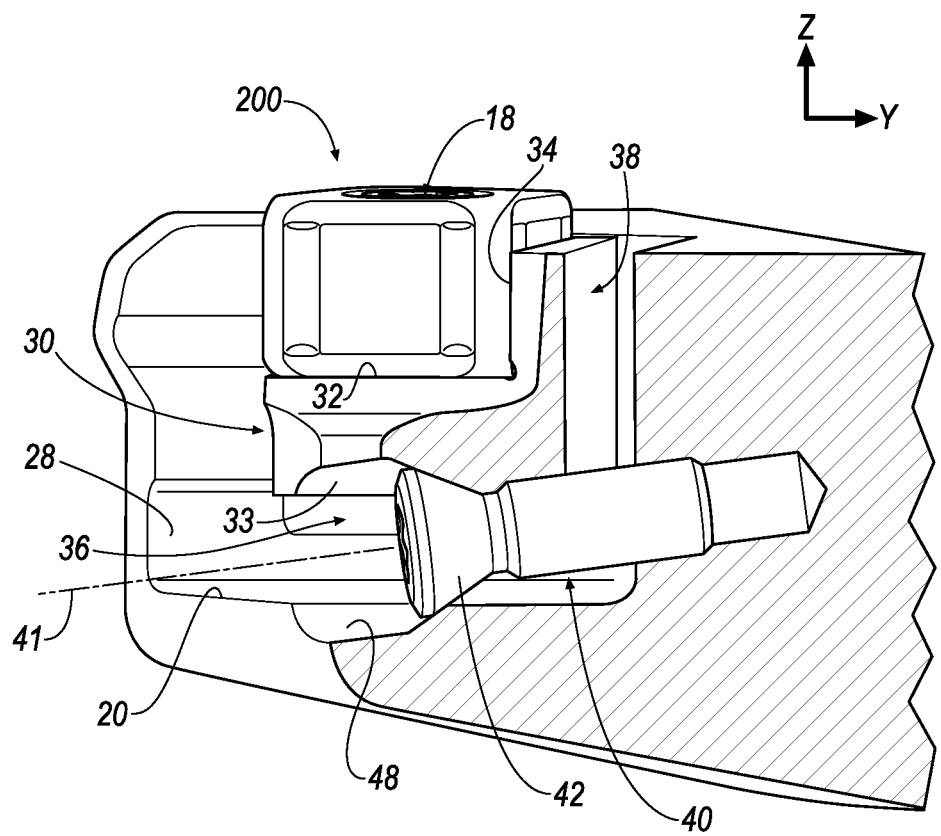
FIG. 5 is a cross sectional view through the center of the adjustment screw of the pocket of the milling cutter of FIG. 1 with the cutting insert isometrically mounted in the adjustable pocket.

In the illustrated embodiment, the cantilevered member 30 includes a top support wall 32 for supporting the cutting insert 200, and a bottom support wall 33 opposite the top support wall 32. The top support wall 32 includes a threaded bore (not shown) to accommodate the screw 18 for mounting the cutting insert 200 on the cantilevered member 30. The cantilevered member 30 also includes a rear support wall 34 for supporting the cutting insert 200, as best seen in FIGS. 2 and 5. In the illustrated embodiment, the cantilevered member 30 provides at least three-point contact with the cutting insert 200. It should be appreciated that the cutting insert 200 is entirely supported by the cantilevered member 30, unlike cutting inserts mounted in insert pockets in conventional cutting tools that are supported by the walls of the pocket.

A clearance gap 36 is provided between the cantilevered member 30 and the bottom wall 20 of the pocket 14. Likewise, a clearance gap 37 is provided between the cantilevered member 30 and the side wall 26 of the pocket 14. Similarly, a clearance gap 38 is provided between the cantilevered member 30 and the rear wall 22 of the pocket 14, as shown in FIGS. 2 and 5. The clearance gaps 36, 37, 38 allow for selective adjustment of the position of the cutting insert 200 by the cantilevered member 30 without interfering with the walls 22, 24, 26 of the pocket 14 of the cutting tool 10.

The cantilevered member 30 acts as a "living hinge" (also known as a "live hinge") to allow the selective adjustment of the axial position of the cutting insert 200. To this end, a thickness 39 of the cantilevered member 30 at the intersection between the cantilevered member 30 and the side wall 24 of the pocket 14 can be selectively adjusted to selectively adjust an amount of movement of the cantilevered member 30 in the direction of the central, longitudinal axis 15 (i.e. in the direction of the z-axis) of the cutting tool 10. In the illustrated embodiment, the thickness 39 of the cantilevered member 30 is in a range between about 0.118 inches (about 3.0 mm) to about 0.236 inches (about 6.0 mm) such that the position of the cutting insert 200 can be selectively adjusted in the direction of the central, longitudinal axis 15 of the cutting tool 10 by a distance, D, of at least 0.002 inches (about 0.051 mm), as shown in FIG. 1. It should be appreciated that the thickness 39 of the cantilevered member 30 can be any desirable value to provide the desired movement of the cutting insert 200.

An adjustment screw 40 is provided to exert a force against the cantilevered member 30 to selectively adjust the position of the cutting insert 200. In one embodiment, the adjustment screw 40 is identical to the screw 18 for mounting the cutting insert 200 on the cantilevered member 30 to minimize the inventory of parts. In another embodiment, the adjustment screw 40 is different than the screw 18. In the illustrated embodiment, the adjustment screw 40 has a central axis 41 and a conical head portion 42 that engages the bottom support wall 33 of the cantilevered member 30, as best shown in FIG. 5. The adjustment screw 40 is threaded into the threaded bore (not shown) of the rear wall 22 of the pocket 14 such that the central axis 41 of the adjustment screw 40 defines an axial angle 44 (FIG. 1) with respect to the axis 16 (i.e. in the direction of the x-axis) and a radial angle 46 (FIG. 2) with respect to the axis 17 (i.e. in the direction of the y-axis). The axial angle 44 is in the range between about five (5) degrees and about ten (10) degrees, and the radial angle 46 is in the range between about twenty (20) degrees and about forty (40) degrees. In one embodiment, the axial angle 44 is about seven (7) degrees and the radial angle is about thirty (30) degrees. It will be appreciated that the axial angle 44 and the radial angle 46 can be selected to adjust the amount of force exerted by the adjustment screw 40 on the cantilevered member 30, and therefore the amount of movement of the cutting insert 200. The bottom wall 20 may also include a channel 48 for providing clearance for the adjustment screw 40, if necessary.

Referring now to FIGS. 6-10, a cutting tool 100, such as a milling cutter, is shown according to another embodiment of the invention. Similar to the milling cutter 10, the milling cutter 100 comprises a tool body 102 with a plurality of circumferentially-spaced insert pockets 104 (only one pocket 104 is shown for brevity). The tool body 102 is made of metal, such as steel, and has a central, longitudinal axis 105 (i.e. in the direction of the z-axis), an x-axis 106 perpendicular to the z-axis, and a y-axis 107 perpendicular to both the x-axis and the z-axis. The tool body 102 is designed to be rotatably driven about a central longitudinal axis 105 (i.e. about the z-axis) in a direction R. Each pocket 104 is adapted to receive the cutting insert 200, which is securely held in the pocket 104 by means of a mounting screw 108, and the like. Only a single pocket 104 in which the cutting insert 200 is tangentially mounted is shown in the illustrated embodiment for brevity. However, it will be appreciated that the invention is not limited by the number of pockets 14 in which the cutting insert 200 can be tangentially mounted therein, and that the invention can be practiced with any desirable number of pockets 14 that are capable of tangentially mounting the cutting insert 200.

Figure 9:
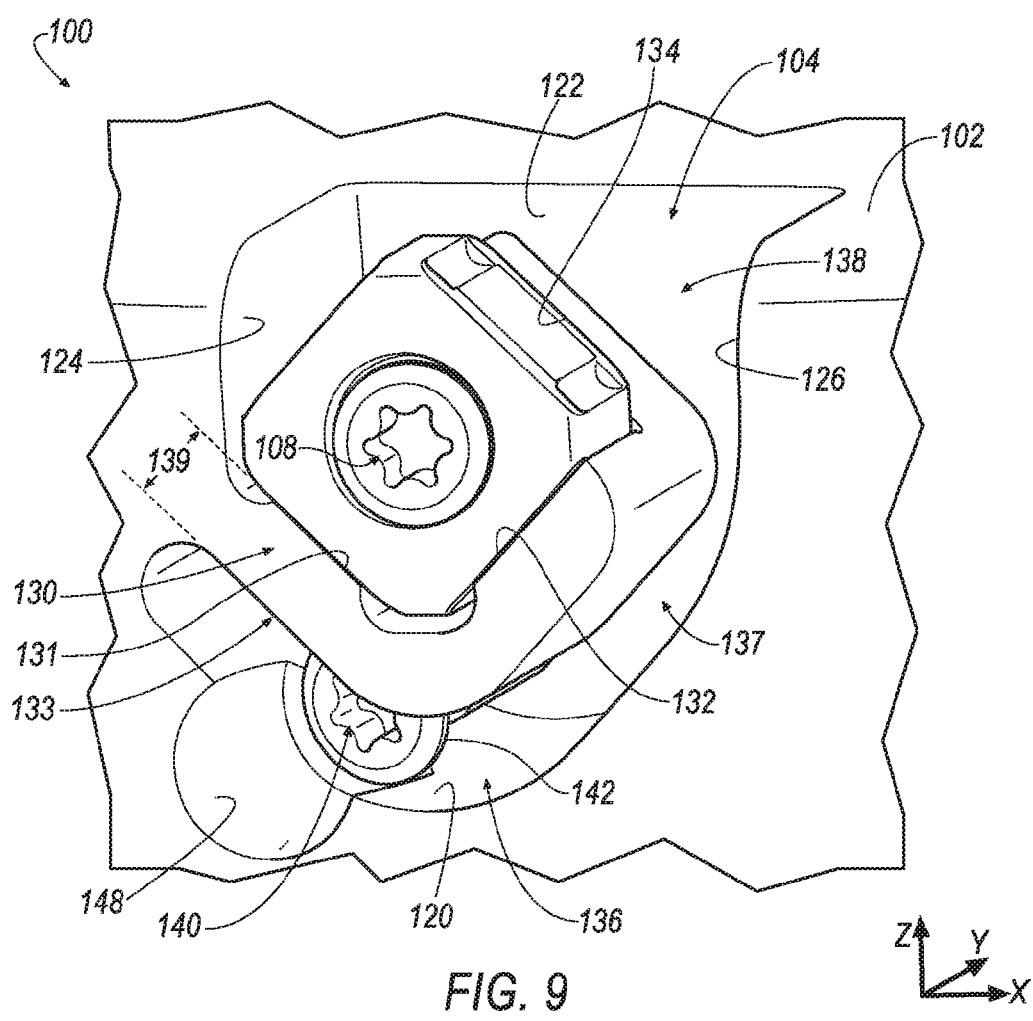
FIG. 9 is an enlarged isometric top view of the pocket of the milling cutter of FIG. 6 with the cutting insert tangentially mounted in the adjustable pocket.

As shown in FIG. 9, each pocket 104 of the cutting tool 100 includes a bottom wall 120, a rear wall 122 and at least one side wall 124, 126. A cantilevered member, shown generally at 130, is integrally formed with the tool body 102 by machining the cantilevered member 130 from the tool body 102.

As shown in FIG. 9, the cantilevered member 130 extends outwardly from one of the walls 120, 122, 124, 126 of the insert pocket 104. In the illustrated embodiment, the cantilevered member 130 extends from the side wall 124 toward the opposite side wall 126. It should be appreciated that the principles of the invention can be practiced by extending the cantilevered member 130 from any of the walls 120, 122, 124, 126 of the insert pocket 104.

The cantilevered member 130 is slightly different than the cantilevered member 30 because the cutting insert 200 is tangentially mounted on the cantilevered member 130, rather than isometrically mounted as in the previous embodiment. In this embodiment, the cantilevered member 130 includes a first top support wall 131 and a second top support wall 132 for support the cutting insert 200, a bottom support wall 133 opposite the first and second top support walls 131, 132, and a rear support wall 134 for supporting the cutting insert 200. The rear support wall 134 includes a threaded bore (not shown) to accommodate the screw 108 for mounting the cutting insert 200 on the cantilevered member 130. In the illustrated embodiment, the cantilevered member 130 provides at least three-point contact with the cutting insert 200. It should be appreciated that the cutting insert 200 is entirely supported by the cantilevered member 130, unlike cutting inserts mounted in insert pockets in conventional cutting tools that are supported by the walls of the pocket.

Figure 6:
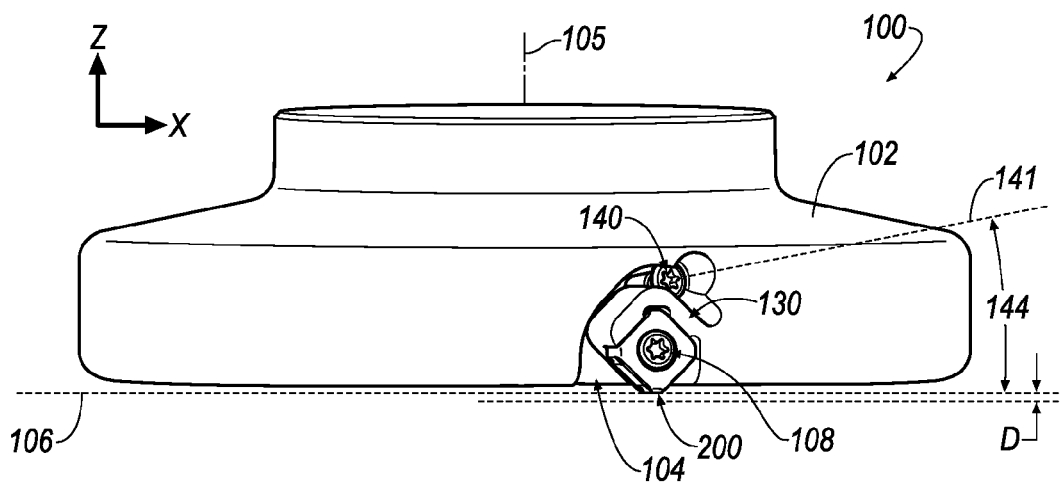
FIG. 6 is a side view of a milling cutter with a cutting insert tangentially mounted in an adjustable pocket according to an embodiment of the invention.
Figure 7:
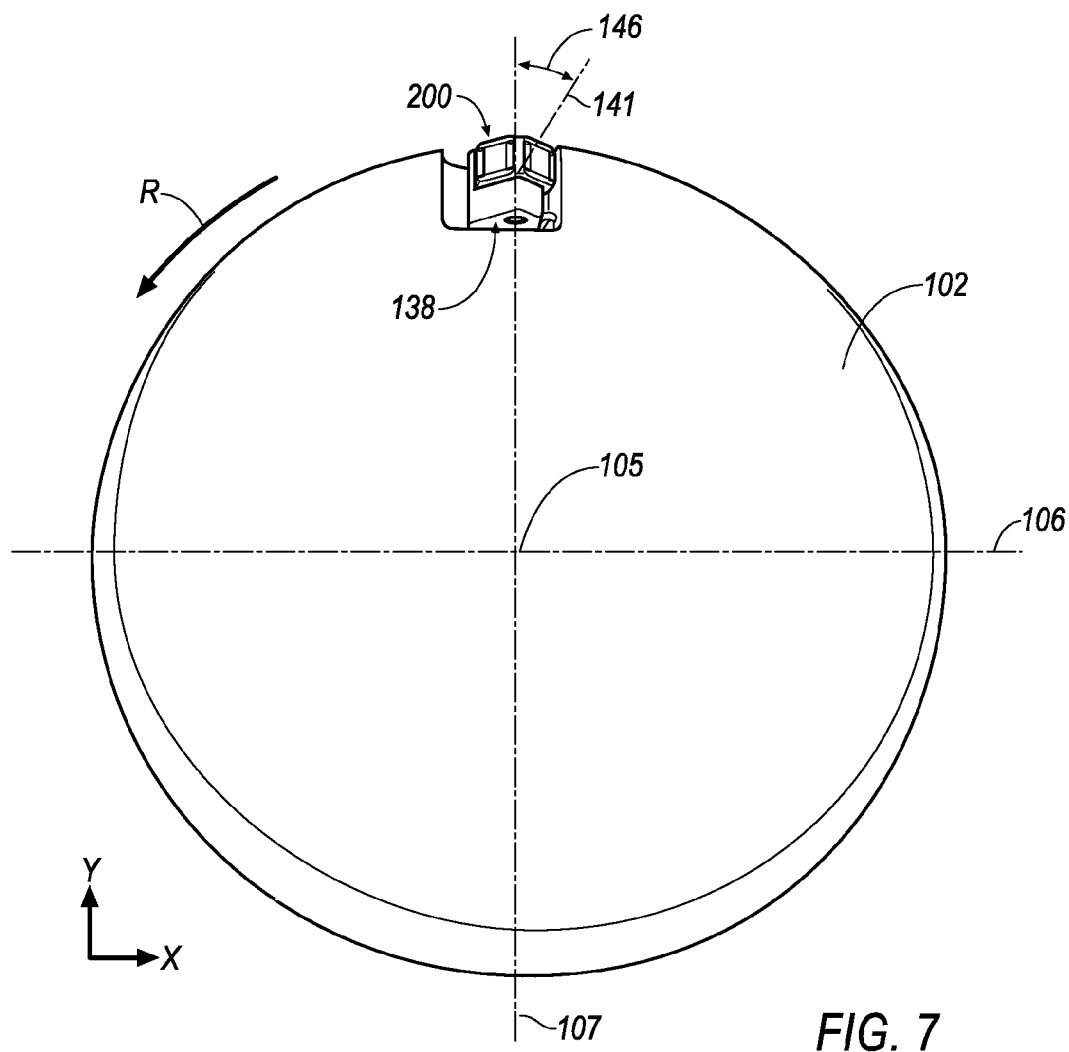
FIG. 7 is a top view of the milling cutter of FIG. 6.
Figure 8:
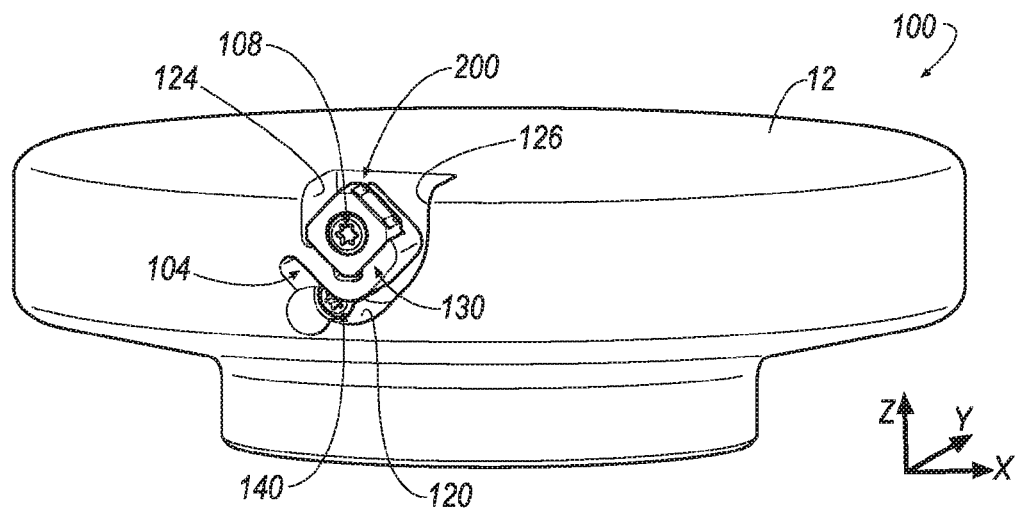
FIG. 8 is an isometric top view of the milling cutter of FIG. 6.
Figure 10:
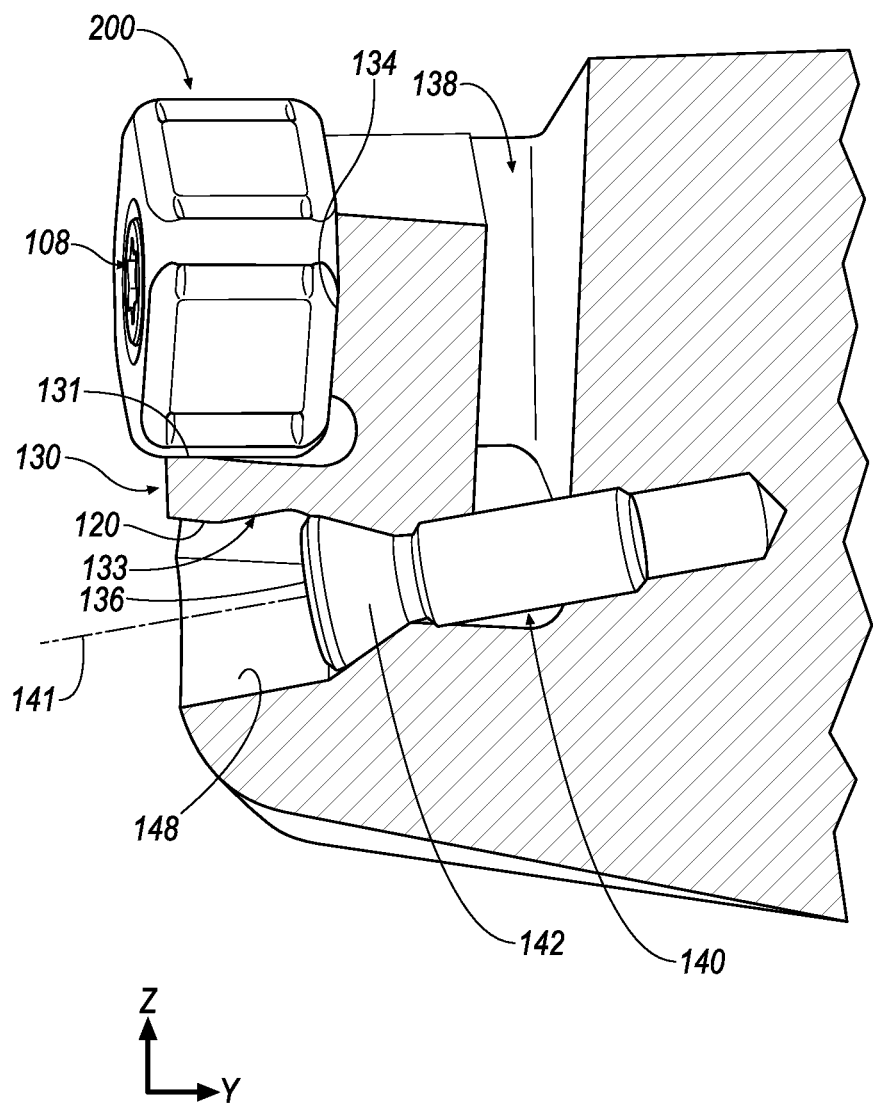
FIG. 10 is a cross sectional view through the center of the adjustment screw of the pocket of the milling cutter of FIG. 6 with the cutting insert tangentially mounted in the adjustable pocket.

A clearance gap 136 is provided between the cantilevered member 130 and the bottom wall 120 of the pocket 104. Likewise, a clearance gap 137 is provided between the cantilevered member 130 and the side wall 126 of the pocket 104. Similarly, a clearance gap 138 is provided between the cantilevered member 130 and the rear wall 122 of the pocket 104, as shown in FIGS. 6 and 10. The clearance gaps 136, 137, 138 allow for selective adjustment of the position of the cutting insert 200 by the cantilevered member 130 without interfering with the walls 122, 124, 126 of the pocket 104 of the cutting tool 100.

Similar to the cantilevered member 30, the cantilevered member 130 acts as a "living hinge" (also known as a "live hinge") to allow the selective adjustment of the axial position of the cutting insert 200. To this end, a thickness 139 of the cantilevered member 130 at the intersection between the cantilevered member 130 and the side wall 124 of the pocket 104 can be selectively adjusted to selectively adjust an amount of movement of the cantilevered member 130 in the direction of the central, longitudinal axis 106 (i.e. in the direction of the z-axis) of the cutting tool 100. In the illustrated embodiment, the thickness 139 of the cantilevered member 130 is in a range between about 0.118 inches (about 3.0 mm) to about 0.236 inches (about 6.0 mm) such that the position of the cutting insert 200 can be selectively adjusted in the direction of the central, longitudinal axis 106 of the cutting tool 100 by a distance, D, of at least about 0.002 inches (about 0.051 mm), as shown in FIG. 6. It should be appreciated that the thickness 139 of the cantilevered member 130 can be any desirable value to provide the desired movement of the cutting insert 200.

An adjustment screw 140 is provided to exert a force against the cantilevered member 130 to selectively adjust the position of the cutting insert 200. The adjustment screw 140 can be identical to the adjustment screw 40 and the screw 18 for mounting the cutting insert 200 on the cantilevered member 130 to minimize the inventory of parts. In the illustrated embodiment, the adjustment screw 140 has a central axis 141 and a conical head portion 142 that engages the bottom support wall 133 of the cantilevered member 130, as best shown in FIG. 10. The adjustment screw 140 is threaded into the threaded bore (not shown) of the rear wall 122 of the pocket 104 such that the central axis 141 of the adjustment screw 140 defines an axial angle 144 (FIG. 6) with respect to the axis 107 (i.e. in the direction of the x-axis) and a radial angle 146 (FIG. 7) with respect to the axis 107 (i.e. in the direction of the y-axis). The axial angle 144 is in the range between about five (5) degrees and about ten (10) degrees, and the radial angle 146 is in the range between about ten (10) degrees and about twenty (20) degrees. In one embodiment, the axial angle 144 is about seven (7) degrees and the radial angle is about fifteen (15) degrees. It will be appreciated that the axial angle 144 and the radial angle 146 can be selected to adjust the amount of force exerted by the adjustment screw 140 on the cantilevered member 130, and therefore the amount of movement of the cutting insert 200. The bottom wall 120 may also include a channel 148 for providing clearance for the adjustment screw 140, if necessary.

It should be appreciated that both cutting tools 10, 100 can include both types of pockets 14, 104 for isometrically and tangentially mounting the cutter insert 200 therein. For example, the cutting tools 10, 100 can include a plurality of pockets 14 for isometrically mounting the cutting insert 200 therein, and a plurality of pockets 104 for tangentially mounting the cutting insert 200 therein. In one embodiment, for example, the cutter body 12, 102 can include sixteen (16) pockets 104 for tangentially mounting the cutting insert 200 therein, and four (4) pockets 14 for isometrically mounting the cutting insert 200 therein.

Figure 11:
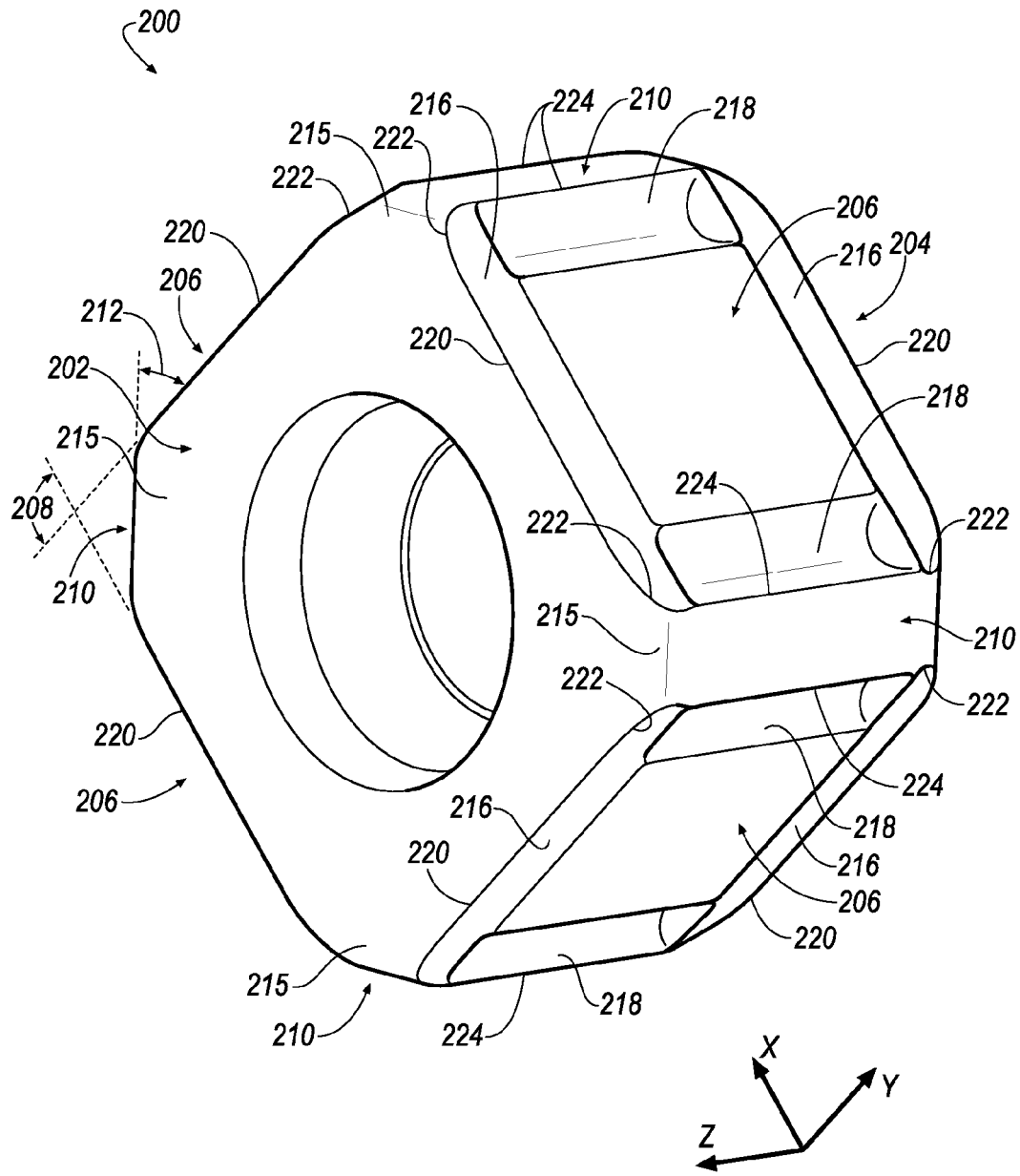
FIG. 11 is an isometric view of a cutting insert capable of being mounted on the cantilevered member in accordance with an embodiment of the invention.
Figure 12:
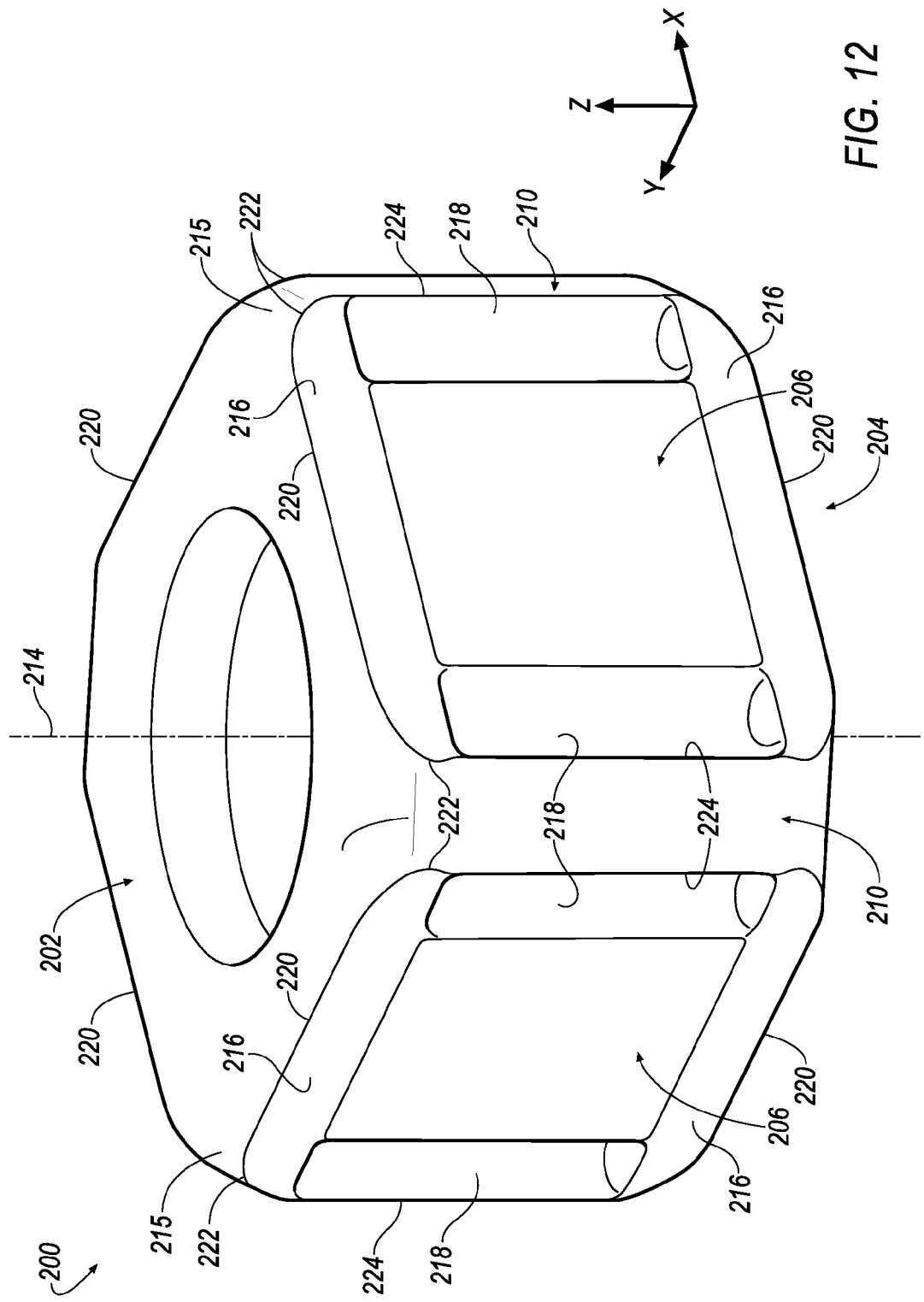
FIG. 12 is an another isometric view of the cutting insert of FIG. 11.

Referring now to FIGS. 11 and 12, an indexable cutting insert 200 is shown according to an embodiment of the invention. In general, the cutting insert 200 has a polygonal body made of a wear-resistant material of a type known in the art. The cutting insert 200 is of a generally cubic in shape that includes a top surface 202, a bottom surface 204 that is parallel and identical to the top surface 202, and a plurality of side surfaces 206 that are identical to each other. In the illustrated embodiment, the cutting insert 200 has four (4) side surfaces 206, each side surface 206 having an angle 208 of approximately ninety (90) degrees with respect to an adjacent side surface 206.

In the illustrated embodiment, each side surface 206 is substantially perpendicular to both the top and bottom surfaces 202, 204. In other words, the top and bottom surfaces 202, 204 are substantially parallel to each other and perpendicular to the side surfaces 206. That is, the side surfaces 206 have a clearance angle of zero (0) degrees. Thus, both the top and bottom surfaces 202, 204 of the cutting insert 200 can be presented to the workpiece (not shown). Thus, the "top" surface 202 becomes the "bottom" surface when the bottom surface 204 is presented to the workpiece, and vice versa. At least two side surfaces 206 and one of the top and bottom surfaces 202, 204 engage the cantilevered member 30, 130 when the cutting insert 200 is mounted on the cantilevered member 30, 130 during cutting operations.

The cutting insert 200 includes a planar corner surface 210 between each of the side surfaces 206. In the illustrated embodiment, the cutting insert 200 includes four (4) planar corner surfaces 210 formed at an angle 212 of forty-five (45) degrees with respect to the adjacent side surface 206, as shown in FIG. 11. The top and bottom surfaces 202, 204 are perpendicular to a central, longitudinal axis 214 of the cutting insert 200, while the side surfaces 206 and the corner surfaces 210 are parallel to the axis 214, as shown in FIG. 12. Thus, the cutting insert 200 is symmetrical about all three axes (x-, y- and z-). Because the cutting insert 200 is symmetric about all three axes (x-, y-, z-) in which the top surface 202 is identical to the bottom surface 204, all the side surfaces 206 and the corner surfaces 210 are identical to each other, only the top surface 202, one side surface 206 and one corner surface 210 will be described in detail herein for brevity. However, it will be appreciated that any discussion of the top surface 202 applies to the bottom surface 204, the discussion of the side surface 206 applies to all the side surfaces 206, and the discussion of the corner surface 210 applies to all the corner surfaces 210.

A corner radius 215 extends entirely between the top and bottom surfaces 202, 204 of the cutting insert 200 and the planar corner surfaces 210. As seen in FIG. 11, each planar corner surface 210 extends entirely between two corner radius 215 associated with the top and bottom surfaces 202, 204.

Each side surface 206 includes one or more chip forming grooves formed therein. For example, each side surface 206 includes a pair of chip forming grooves 216 extending along the top and bottom surfaces 202, 204 and perpendicular to the central, longitudinal axis 214. In addition, each side surface 206 includes a pair of chip forming grooves 218 extending along the corner surfaces 210 and parallel to the central, longitudinal axis 214. The chip forming grooves 216, 218 have different profiles as shown in the illustrated embodiment. However, the chip forming grooves 216, 218 can have the same profile.

A primary finishing wiper cutting edge 220 is formed at the intersection between each chip forming groove 216 and the top and bottom surfaces 202, 204 of the cutting insert 200. Thus, the cutting insert 200 has four (4) wiper cutting edges 220 formed at the intersection between the chip forming grooves 216 and the top surface 202, and four (4) wiper cutting edges 220 formed at the intersection between the chip forming grooves 216 and the bottom surface 204 for a total of eight (8) wiper cutting edges 220. As seen in FIG. 10, the wiper cutting edges 220 are perpendicular to the central, longitudinal axis 214 of the cutting insert 200. The wiper cutting edges 220 are the active, primary cutting edges when the cutting insert 200 is isometrically mounted on the cantilevered member 130 and it should be understood that the chip forming grooves 216 aid in the formation and removal of chips formed during a machining operation. Each finishing wiper cutting edge 220 is lower in elevation than the side surface 206 to allow the side surface 206 to contact the cantilevered member 30, 130 and properly seat the cutting insert 200 thereon.

A secondary roughing corner cutting edge 222 is formed at the intersection between each corner radius 215 and each chip forming groove 216. Thus, the cutting insert 200 has eight (8) left-handed roughing corner cutting edges 222 and eight (8) right-handed roughing corner cutting edges 222 for a total of sixteen (16) roughing corner cutting edges 222. Each roughing corner cutting edge 222 is elliptical in shape because of the rounded shape of the corner radius 215 and the profile of the chip forming grooves 216.

As seen in FIGS. 11 and 12, both the finishing wiper cutting edges 220 and the roughing corner cutting edges 222 are presented to the workpiece (not shown) when the cutting insert 200 is isometrically mounted on the cantilevered member 30 of the cutting tool 10.

A finishing wiper cutting edge 224 is formed at the intersection between each planar corner surface 210 and each chip forming groove 218. Thus, each side surface 206 of the cutting insert 200 has two (2) wiper cutting edges 224 formed at the intersection between the chip forming grooves 218 and the planar corner surfaces 210 for a total of eight (8) wiper cutting edges 224 (4 side surfaces×2 cutting edges/side=8 cutting edges). As seen in FIG. 12, the finishing wiper cutting edges 224 are parallel to the central, longitudinal axis 214 of the cutting insert 200. The finishing wiper cutting edges 224 are the active, primary cutting edges when the cutting insert 200 is tangentially mounted on the cantilevered member 130 and it should be understood that the chip forming grooves 218 aid in the formation and removal of chips formed during a machining operation.

It will be understood that the profile of the primary finishing wiper cutting edge 220 and the finishing wiper cutting edge 224 is defined by the cross-sectional shape of the chip forming grooves 216, 218, respectively. In the illustrated embodiment, the primary finishing wiper cutting edge 220 and the finishing wiper cutting edge 224 have a substantially planar profile. However, it will be appreciated that the invention is not limited by the profile of the primary finishing wiper cutting edge 220 and the finishing wiper cutting edge 224, and that the invention can be practiced with any desirable profile, such as a cutting edge having a large radius, and the like.

As described above, the cutting tool 10, 100 of the invention is capable of selectively adjusting the finishing and roughing cutting edges 220, 222, 224 of the cutting insert 200 that is isometrically and/or tangentially mounted to the cantilevered member 30, 130 integrally formed by machining the cutter body 12, 102. The cutting tool 10, 100 is capable of selectively adjusting the cutting insert 200 by at least about 0.002 inches (about 0.051 mm). As a result, the cutting tool 10, 100 of the invention is capable of producing a fine finish on the workpiece when performing both roughing and fine finishing machining operations of the workpiece, particularly a workpiece made of soft metal, such as cast iron, and the like.

The patents and publications referred to herein are hereby incorporated by reference.

Having described presently preferred embodiments the invention may be otherwise embodied within the scope of the appended claims.

What is claimed is:

1. A cutting tool having a central, longitudinal axis, comprising:
   a tool body including an insert pocket with a bottom wall, a rear wall and at least one side wall;
   a cantilevered member extending from one of the walls of the insert pocket; and
   an adjustment screw for exerting a force against the cantilevered member to selectively adjust a position of a cutting insert mounted on the cantilevered member,
   wherein the cantilevered member includes a top support wall, a bottom support wall opposite the top support wall, and a rear support wall, and
   wherein said adjustment screw is threaded into a threaded bore extending into the rear wall of the pocket and defining a positive axial angle with respect to an x-axis of the cutting tool and a positive radial angle with respect to a y-axis of the cutting tool.

2. The cutting tool according to claim 1, wherein the adjustment screw exerts a force against the bottom support wall of the cantilevered member to selectively adjust the position of a cutting insert.

3. The cutting tool according to claim 1, further comprising a first clearance gap between the cantilevered member and the bottom wall of the pocket, and a second clearance gap between the cantilevered member and the at least one side wall of the pocket, and a third clearance gap between the cantilevered member and the rear wall of the pocket.

4. The cutting tool according to claim 1, wherein the position of the cutting insert can be selectively adjusted in the direction of the central, longitudinal axis of the cutting tool by a distance, D, of at least about 0.002 inches (about 0.051 mm).

5. The cutting tool according to claim 1, wherein the cutting insert is entirely supported by the cantilevered member.

6. A combination cutting tool and cutting insert, comprising:
a cutting tool having a central, longitudinal axis comprising:
a tool body including an insert pocket with a bottom wall, a rear wall and at least one side wall;
a cantilevered member extending from one of the walls of the insert pocket, the cantilevered member including a top support wall, a bottom support wall opposite the top support wall, and a rear support wall;
an adjustment screw for exerting a force against the cantilevered member; and
a cutting insert mounted on the cantilevered member, comprising:
a top surface, a bottom surface, and a plurality of side surfaces, each side surface including a first pair of chip grooves and a second pair of chip grooves extending perpendicular to the first pair of chip grooves;
a plurality of primary wiper cutting edges formed at an intersection between each of the first pair of chip grooves and the top and bottom surfaces,
wherein the adjustment screw exerts a force against the cantilevered member to selectively adjust a position of the primary wiper cutting edges of the cutting insert with respect to the central, longitudinal axis of the cutting tool, and
wherein said adjustment screw is threaded into a threaded bore extending into the rear wall of the pocket and defining a positive axial angle with respect to an x-axis of the cutting tool and a positive radial angle with respect to a y-axis of the cutting tool.

7. The combination according to claim 6, wherein the cantilevered member extends from the at least one side wall of the insert pocket.

8. The combination according to claim 5, wherein the cutting insert is isometrically mounted on the cutting tool.

9. The combination according to claim 5, wherein the cutting insert is tangentially mounted on the cutting tool.

10. The combination according to claim 6, wherein the adjustment screw exerts a force against the bottom support wall of the cantilevered member to selectively adjust a position of a cutting insert.

11. The combination according to claim 6, wherein the cutting insert is entirely supported by the cantilevered member.

* * * * *